July 21, 1964 W. LINDEMANN ETAL 3,141,401
MACHINE FOR PREPARING SCRAP METAL
Filed May 6, 1958 5 Sheets-Sheet 1

Fig. 1

Inventors
Waldemar Lindemann
Fritz von Endert
By Cleveland B. Hallabaugh.
Attorney

Fig. 2

Inventors
Waldemar Lindemann
Fritz van Endert
By Cleveland B. Hallabaugh
Attorney

Fig. 4

United States Patent Office 3,141,401
Patented July 21, 1964

3,141,401
MACHINE FOR PREPARING SCRAP METAL
Waldemar Lindemann, Birkenweg 7, Dusseldorf-Meererbusch, Germany, and Fritz van Endert, Dusseldorf-Oberkassel, Germany; said Van Endert assignor to said Lindemann
Filed May 6, 1958, Ser. No. 733,412
Claims priority, application Germany May 11, 1957
13 Claims. (Cl. 100—98)

This invention relates to a machine for preparing scrap metal for smelting and more particularly to such a machine which is capable of performing the functions of both a scrap metal baling press and of a scrap metal shear.

As is well known, there are two methods of preparing scrap metal for smelting. Relatively light, bulky scrap metal is compressed into coherent bales which are more or less solid masses of metal. Such baling of light scrap metal is desirable both from the standpoint of convenience in handling the scrap metal and of avoiding a loss of the metal by burning when it is introduced into a smelting furnace. Heavy scrap metal of relatively thick cross-section does not need to be baled to prevent is from burning during the smelting operation and, in any case, cannot be baled or only with great difficulty. However, such heavy scrap metal is frequently of such size that it must be cut into pieces which can be conveniently handled. As a rule, therefore, a scrap metal yard must be equipped with both a scrap metal baling press and with scrap metal shears, so that the scrap metal, after being sorted, can be either baled or sheared into smaller pieces as may be required.

The desired dimensions for bales of scrap metal have been continually increasing with the result that both the dimensions and power required of scrap metal baling presses have been continually increasing. At the same time, the dimensions of the heavy scrap metal have continually increased requiring larger and more powerful shears to reduce it to pieces of the desired size. The limit of economy is being reached due to the increasing capital outlay and the large space required for these increasingly larger and more powerful machines. The result is that the scrap metal yards are either restricting themselves to the use of the smaller machines or, alternatively, installing either a scrap metal baling machine or a scrap metal shears and restricting their activities to dealing with light or with heavy scrap metal. Each of these alternatives are uneconomical.

It is the object of this invention to overcome this difficulty by providing a single machine which can be used equally well as a scrap metal baling press and as a scrap metal shears, thereby making it possible for a scrap metal yard, for a given initial capital, to carry out both of the methods for the preparation of scrap metal with a single machine which has far greater capacity than two separate machines, both as to the size of the bales of scrap metal which can be produced as regards the dimensions of the pieces of scrap metal which can be cut.

A further object is to provide a single machine which can be used efficiently either as a scrap baling machine or as a scrap metal shears, which requires materially less space than a baling press and a shears of the same capacities for the respective operations, and which requires less maintenance than the two separate machines due to the fact that it has fewer working parts than those of the two machines.

Other objects of this invention and its various advantageous features will become apparent from the detailed description of the invention which follows.

The machine, in accordance with this invention, comprises the combination of a cooperating pair of shearing blades one of which is moveable, a conveyor positioned in front of the shearing blades which is adapted to intermittently feed scrap metal into the cutting plane of the shearing blades, a pressing chamber directly behind the shearing blades, provided with a closeable ejection aperture, and a press ram directly behind the cutting plane of the shearing blades which is adapted to compress scrap metal within the pressing chamber and which is referred to hereinafter as the "main press ram." The press ram and the moveable shearing blade preferably are positioned to travel along perpendicular lines. One of the cooperating shearing blades is desirably provided with a V-shaped cutting edge, while the other has a straight cutting edge. These shearing blades are hereinafter termed the "main shearing blades." A machine thus constructed can be used equally well for the cutting of heavy scrap metal as well as for producing bales of light scrap metal.

In a preferred embodiment of the machine in accordance with this invention, the main press ram directly behind the cutting plane of the shearing blades is the carrier for the moveable shearing blade. This combination press ram and shearing blade carrier provides a major economy in both the initial construction of this machine and in its maintenance, since only a single hydraulic drive is required to perform the main working operations of the machine and the same tool serves two purposes, i.e. shearing of heavy scrap metal and the compression of light scrap metal.

The machine, in accordance with this invention, also is preferably provided with a second press ram which will be referred to hereinafter as an "ejection ram" which operates within the pressing chamber in a line of travel at right angles to that of the combination press ram and blade carrier, and in a direction toward the ejection aperture. Thus, it is positioned to travel in a horizontal line, when the first mentioned press ram is positioned to travel along a vertical line. This press ram is desirably provided with a hydraulic drive which is adapted to operate either at low speed with high pressure or at high speed with low pressure.

This ejection press ram is adapted to perform three functiontions. It is adapted to compress the bale of scrap metal in a direction at right angles to the pressure applied by the combination press ram and blade carrier and for the ejection of the compressed bale of scrap metal from the press box, during the use of the machine for baling light scrap metal. On the other hand, it is adapted for the rapid ejection from the pressing chamber of heavy pieces of scrap metal which have been cut by the shearing blades. Thus, this ejection ram offers the distinct advantage of utilizing a single hydraulic drive system for three purposes.

In a preferred embodiment of the machine, in accordance with this invention, the closure for the ejection aperture is a slide provided with a hydraulic drive, which carries a shearing blade along its edge which moves across the ejection aperture, and the edge of the ejection aperture is provided with a fixed shearing blade positioned to cooperate with the moveable blade affixed to the slide. These cooperating shearing blades will be referred to hereinafter as the "ejection shears." This slide may be conveniently positioned to travel in a vertical line and to close the ejection aperture from above. When so positioned, the moveable cutting blade is along its lower edge and the cooperating fixed blade is along the lower edge of the ejection aperture. One of the two cooperating shearing blades preferably has a V-shaped cutting edge, while the other has a straight cutting edge.

This feature of using a moveable slide provided with a shearing blade, the cutting edge of which cooperates with the cutting edge of a fixed shearing blade, enables the slide and its hydraulic drive to be used for two purposes.

During the use of the machine for the baling of light scrap metal, it opens and closes the ejection aperture of the pressing chamber, while during the use of the machine for cutting heavy scrap metal it provides a means for shearing the scrap at right angles to the cut made by the first pair of shearing blades.

Another feature which is desirably included in the preferred embodiment of the machine in accordance with this invention is a moveable ram, provided with a hydraulic drive, and positioned in front of the cutting plane of the main shearing blades, which is referred to hereinafter as a "holding ram." This ram is preferably positioned to move in a path paralleling that of the main press ram. This ram has two functions. During the use of the machine for the baling of scrap metal, this ram can be used to compact the scrap metal and when provided with a powerful hydraulic drive, pre-compresses the metal and prevent it from jamming in the passage between the first pair of shearing blades. During the use of the machine for the shearing of heavy scrap metal, this ram can be brought to bear on a load of the metal to hold it firmly while it is cut by the main shearing blades.

The preferred embodiment of this machine is desirably provided with a scrap-receiving chamber positioned in front of the cutting plane of the first pair of shearing blades, within which the above mentioned conveyor operates. The scrap-receiving chamber is desirably rectangular in form with an open top. The conveyor which operates within the lower portion of this scrap-receiving chamber may be a ram, hereinafter termed the "feeding ram," adapted to be moved longitudinally within the chamber by a hydraulic drive, from a position within an aperture in the rearwardly wall of the chamber to a position in which its working face is in the cutting plane of the main shearing blades. In its backwardly position, the face of this ram forms the lower portion of the rearwardly wall of the scrap-receiving chamber, while in its most forwardly position the face of this ram forms a part of the wall of the pressing chamber.

This feeding ram is desirably provided with a plate which extends backwardly from the upper edge of its working face a distance at least equal to the length of the scrap-receiving chamber. When the feeding ram is in its most forwardly position, this plate serves two purposes. It protects the mechanism which operates the feeding ram, and at the same time functions as a floor for the upper part of the scrap-receiving chamber which permits the deposit of scrap metal within the chamber during the operation of the feeding ram. Scrap metal deposited on this plate while the feeding ram is wholly or partially in its forwardly position is brushed off of the plate by the rear wall of the scrap-receiving chamber as the ram is withdrawn to its rearwardly position. Thus, this plate permits the scrap-receiving chamber to be fed with scrap metal, either continuously or intermittently without regard to the operation of the feeding ram, both when the machine is being used for the baling of light scrap metal and for the shearing of heavy scrap metal.

The forwardly wall of the scrap-receiving chamber has a lower edge positioned just above the path of travel of the upper edge of the operating face of the feeding ram as it moves into its most forwardly position to form a portion of a wall of the pressing chamber of the machine. In the embodiment of this invention which includes a holding ram, this forwardly wall of the scrap-receiving chamber is positioned adjacent the holding ram and serves both as a guide for that ram and as a protection from scrap metal in the receiving chamber when it is in operation. In an embodiment of this machine which does not include a holding ram, this forwardly wall of the scrap-receiving chamber, protects and acts as a guide for the carrier of the moveable blade of the main shears of the machine. In the preferred embodiment of this invention in which the main press ram acts as the carrier for the moveable blade of the main shears, this forwardly wall of the scrap- receiving chamber, acts as a guide wall for the main ram.

In the embodiment of the machine in accordance with this invention, which includes a holding ram in front of the main shears, we prefer to position a guide wall between the main ram and the holding ram of the machine. When included in our machine, this guide wall, like the forwardly wall of the scrap-receiving chamber, extends downwardly to a position such that its lower edge is just above the upper edge of the operating face of the feeding ram as it moves forwardly to form a portion of a wall of the pressing chamber of the machine.

Having now indicated the general nature of the combination scrap baling and scrap shearing machine, in accordance with this invention, and the manner in which it operates, we will now proceed with a detailed description of a preferred embodiment of this machine which includes each of the desirable features which have been described hereinbefore, with reference to the accompanying drawing in which like reference characters are used to refer to like parts wherever they may occur. It will be understood that our invention is not limited to a machine which includes all of the features which are included in the following description, since several of them can be omitted in more or less simplified versions of our machine, while still obtaining definite advantages over the equipment which has heretofore been developed in this field. In the drawing:

Figure 1:
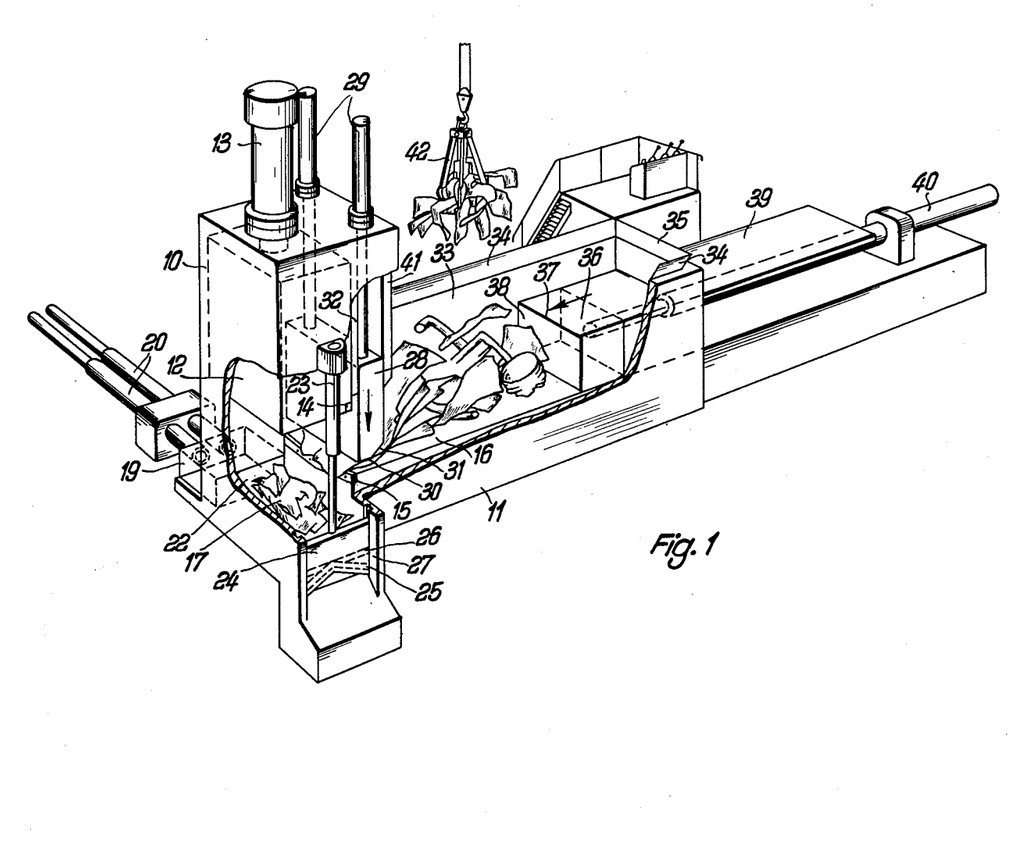
FIGURE 1 is a diagrammatic, perspective view of the machine in accordance with this invention, illustrating its operation for the baling of light scrap metal in a phase of its operation in which its scrap-receiving chamber is being loaded, its holding ram is precompressing the light scrap metal and its pressing chamber has received a portion of a charge of scrap metal.

Referring specifically to FIGURES 1 to 4, inclusive, the numeral 10 designates a housing having a scrap-receiving chamber 11 positioned behind it. A ram 12 is vertically moveable in the housing 10 by the action of the hydraulic drive 13. As shown by FIGURE 1, the lower edge of the ram 12 facing the scrap-receiving chamber 11 carries a cutting blade 14, the cutting edge of which is in the same plane with the cutting edge of a V-shaped stationary cutting blade 15 and is adapted to cooperate therewith.

The stationary blade 15 forms the edge of the floor 16, of the scrap-receiving chamber 11. The floor has a V-shaped cross-section corresponding to that of the stationary blade 15. The floor 16 functions both as a floor for the scrap-receiving chamber 11 and as a guide path for the feeding ram assembly, hereinafter described in detail, which pushes scrap-metal to be worked forwardly out of the scrap-receiving chamber 11.

The space within the housing 10 below the face of the ram 12, forms a chamber 17, which is closeable on all sides and adapted to serve as a pressing chamber for scrap metal during the baling operation. The ram 19 is positioned to enter the chamber 17 through a rectangular aperture 18 in one of the side walls of the chamber 17 and to travel horizontally in that chamber. The ram 19 is provided with a hydraulic drive mechanism 20 which is adapted to move in the direction of the arrow 21 of FIGURE 3, either with high pressure at low speed or with low pressure at high speed. The hydraulic drive 20 is also equipped for return movement in the opposite direction to the arrow 21 at high speed. The details of this drive mechanism are not shown by the drawings.

The wall of the chamber 17, opposite the face 22 of the ram 19, is formed by a slide 24 which is provided with a hydraulic drive 23 adapted to raise and to lower the slide, and thereby, open and close the ejection aperture 27 in the chamber 17. The slide 24 carries on its lower edge a V-shaped cutting blade 25. The lower edge of the ejection aperture 27 is provided with a stationary blade 26 along the outer edge of the floor of the chamber 17, which has its cutting edge positioned in the same plane of the floor of the chamber 17 and in the same plane as the cutting edge of the blade 25, which is adapted to cooperate with the blade 25 in the cutting of scrap metal when the slide 24 is lowered by the action of the hydraulic drive 23.

The ram 28, provided with the hydraulic drives 29, 29 is positioned behind the cutting plane of the blades 14 and 15 and is moveable by the action of the hydraulic drive 29, in a direction parallel to the movement of the ram 12. It is desirable, although not essential, to position a wall 32 between ram 12 and ram 28, to act as a guide for each of these rams. The wall 41 of the main housing 10 also acts to guide the ram 28. Further, it protects the mechanism of ram 28 from damage by scrap metal being deposited in the scrap-receiving chamber 11 and is a front wall for that chamber. It is desirable to provide a bevel 31 along the edge of the lower face 30 of the ram 28.

The scrap-receiving chamber 11 has a scrap-receiving channel 33 which is open at the top and provided with side walls 34, 34 and a rear wall 35 which are flared outwardly near their upper edges. The rear wall 35 is provided with an aperture through which a feeding ram 36 can enter the scrap-receiving chamber 11. The feeding ram 36 is provided with a hydraulic drive 40 which is adapted to move the ram forwardly across the scrap-receiving chamber 11 at a selected speed, either intermittently or continuously and to move it backwardly at high speed. The upper edge 37 and the face 38 of the feeding ram 36 is located well below the upper edges of the walls 34, 34 and 35 of the scrap-receiving chamber 11. A plate 39, rigidly connected to the ram 36, extends backwardly from the upper edge 37 of the ram for a distance such that when the ram is moved across the scrap-receiving chamber 11 to its extreme forwardly position, it forms a floor for the upper portion of the scrap-receiving chamber 11. Both the wall 41, which functions as a guide for the ram 28 and the wall 32 which functions as a guide for both the ram 28 and the ram 12, extend downwardly to a position such that their lower edges clear the upper edge 37 of the feeding ram 36 when it is moved to its extreme forwardly position.

Figure 2:
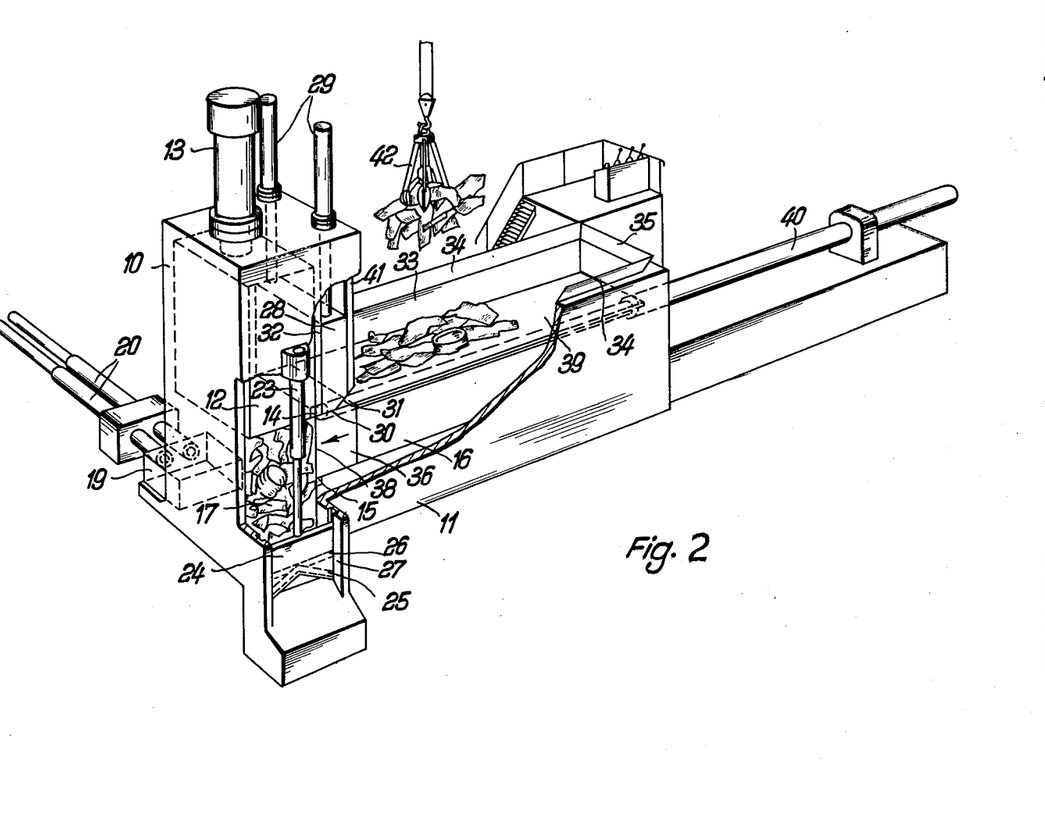
FIGURE 2 is a diagrammatic, perspective view of the machine when in a second phase of its operation in the baling of light scrap metal, when its feeding ram is in its most forwardly position, the pressing chamber carries a load of scrap metal in position for compression and when the trailing plate of the feeding ram forms a floor for the upper portion of the scrap-receiving chamber.
Figure 3:
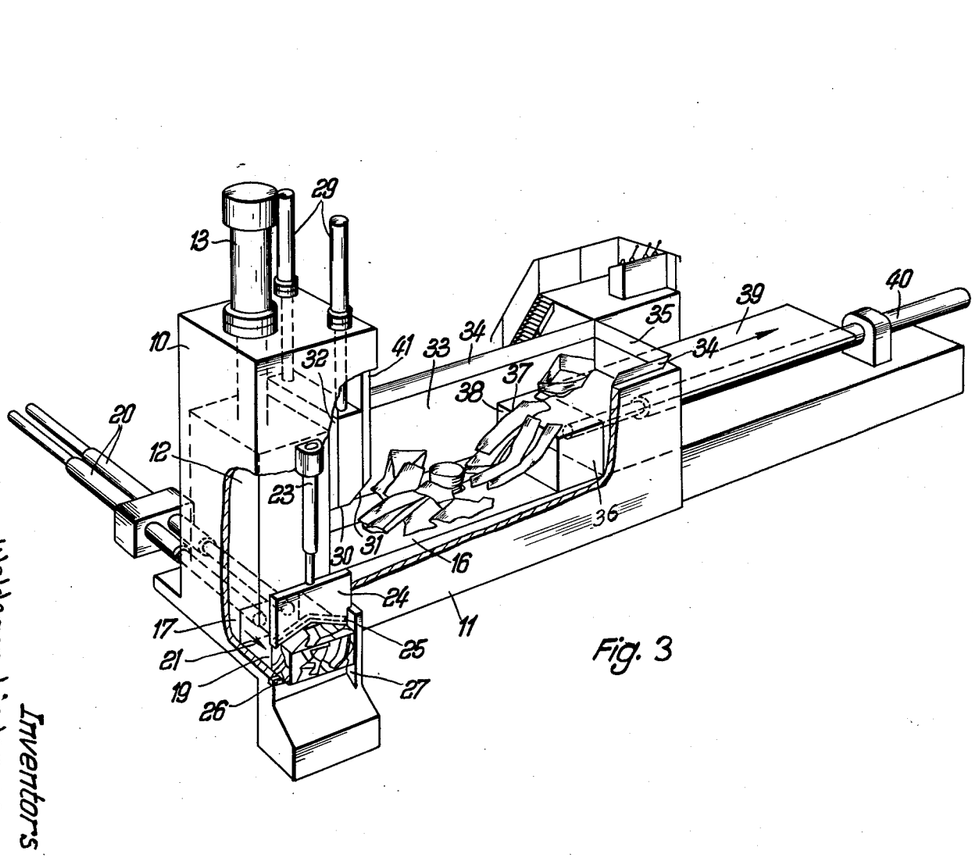
FIGURE 3 is a diagrammatic, perspective view of the machine when in a third phase of its operation in the baling of light scrap metal, in which the feeding ram is being withdrawn, and the ejection ram is forcing a compressed bale of the scrap metal from the pressing chamber.
Figure 4:
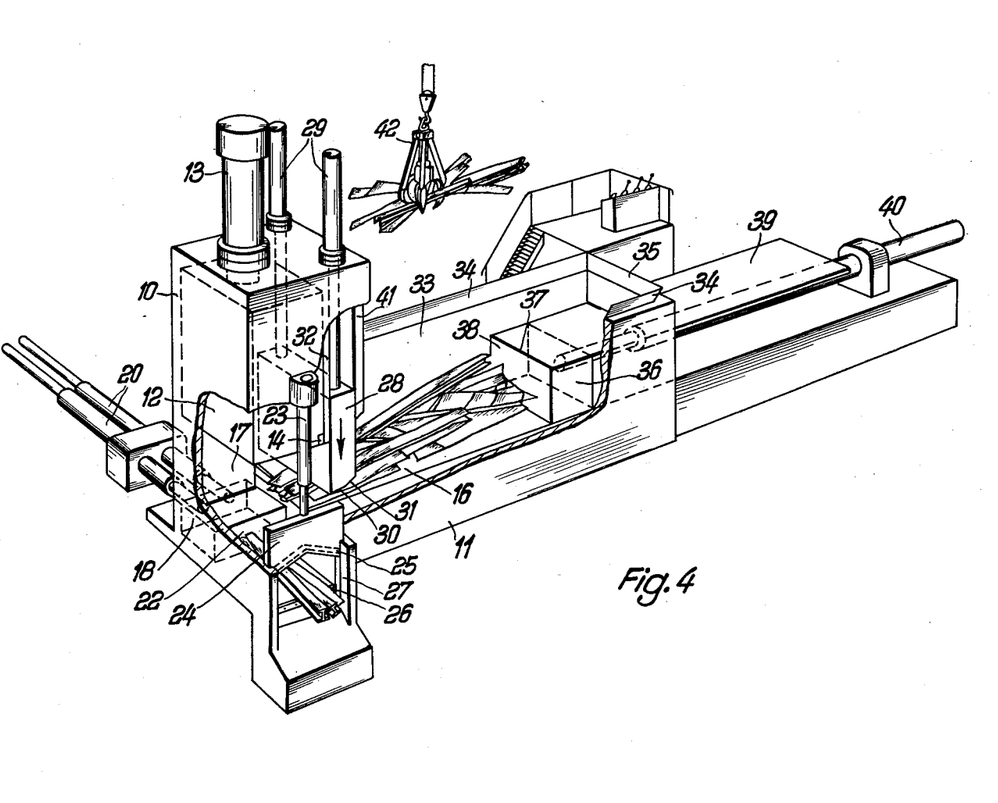
FIGURE 4 is a diagrammatic, perspective view of the machine in the phase of its use as a shear in which heavy scrap metal is held by the holding ram for cutting by the main shears of the machine and in which heavy scrap metal in the press chamber has been moved forwardly into the cutting plane of the ejection shears in position for cutting at right angles to a cut made by the main shears.

In the operation of this combination scrap-shearing and baling machine, illustrated by FIGURES 1 to 4, inclusive, scrap metal may be introduced continuously or intermittently into scrap-receiving channel 33. Thus, the scrap metal may be dropped intermittently into the scrap-receiving channel 33 from a grab 42 of a crane not shown by the drawings. Again scrap metal may be fed continuously to the scrap-receiving channel 33 by a conveyor system. This can be carried out irrespective of the actual position of the feed ram 36 and independently of the direction in which it is moving. When the feed ram 36 is in its extreme rearwardly position the scrap metal comes to rest on the floor 16 of the scrap-receiving chamber 11, in front of the face 38 of the feed ram 36. When the feed ram 36 is in its most forwardly position as illustrated by FIGURE 2, the scrap metal comes to rest on the plate 39 and then falls to the floor 16 as the ram 36 is moved backwardly by the brushing action of the rear wall 35, as illustrated by FIGURE 3. When the feeding ram 36 is in an intermediate position as illustrated by FIGURES 1, 3 and 4, the scrap metal being dropped into the channel 33 comes to rest, in part on the floor 16 and in part on the plate 39.

When baling relatively light scrap metal which requires no shearing, the rams 12 and 28 are raised and as their lower edges rise above the blade 15, scrap metal resting on the floor 16 is slid forwardly into the chamber 17 by the forwardly movement of the feeding ram 36. The feeding ram 36 is then retracted and any scrap which has come to rest on the plate 39 falls to the floor 16 and is, in turn, moved into the chamber 17 by a forwardly movement of the ram 36. This operation is repeated as many times as required to introduce the quantity of scrap metal into the chamber 17 as may be desired in a single compressed bale of the metal.

During the filling of the chamber 17 with the scrap metal, the scrap sometimes piles up in front of the aperture between the blades 14 and 15, and tends to create a stoppage in the operation of the machine. When such an accumulation occurs, the ram 28 is lowered to compress the piled scrap, as illustrated by FIGURE 1.

At the end of a cycle for the filling of the chamber 17, the feeding ram 36 is in its most forwardly position with its end face 38 positioned in the cutting plane of the blades 14 and 15, as illustrated by FIGURE 2. The surface 38 of the feeding ram 36 forms a portion of the backwardly wall of the chamber 17 and the scrap positioned in that chamber is ready for its final compression into a coherent bale by the action of the rams 12 and 19.

The ram 12 is first lowered to compress the scrap metal within the chamber 17, to a volume which fills the full width of the chamber 17 and to the height of the face of the ram 19. Thus, the ram 12 performs the first stage of the final compression of the bale of scrap metal. The second and completing stage of the final stage of the compression of the bale of scrap metal is carried out by the ram 19 which is moved forward, while the slide 24 is in a closed position, to apply the final pressure to the scrap metal and compress it to a coherent bale. The pressure on the ram 19 is then relieved and the slide 24 raised to open the aperture 27. The bale of compressed scrap metal within the chamber 17 is then ejected through the aperture 27 by a further forwardly movement of the ram 19, as illustrated by FIGURE 3.

In carrying out the compression operation as described in the foregoing, heavy pieces of scrap metal may become jammed between the face 38 of the feeding ram 36 and the opposing wall of the housing 10, with the result that the forward movement of the ram 36 to the cutting plane of the knives 14 and 15 is obstructed. In such an event, the ram 28 is lowered to hold the scrap metal as illustrated by FIGURE 4 and the ram 12 is then lowered to shear the obstructing pieces of scrap by the action of the blades 14 and 15. The rams 12 and 28 are then raised and scrap metal remaining in the scrap-receiving chamber 11 pushed into the chamber 17 by an additional forwardly movement of the feeding ram 36. The compression of the bale of scrap metal can then be completed by the action of the rams 12 and 28 as described hereinbefore.

FIGURE 4 illustrates the use of the machine for the cutting of heavy extended pieces of scrap metal which cannot be readily compressed into coherent bales as described by the foregoing. In such operation, the scrap metal is introduced into the channel 33 in the manner described hereinbefore. As the rams 12 and 28 are raised these heavy pieces of scrap metal are pushed through the cutting plane of the blades 14 and 15, a distance corresponding to the length of the pieces which are desired. The ram 28 is then lowered to firmly hold the heavy pieces of scrap metal for the cutting operation and to compress any light, readily deformable scrap metal admixed therewith. The ram 12 is then lowered to cut-off the scrap extending over the edge of the blade 15 into the chamber 17. The pieces of scrap metal which fall into chamber 11 can then be compressed with other scrap as described hereinbefore, or alternatively, ejected from the chamber 17 while the slide 24 is in an open position by the action of the ram 19. In such ejection of the sheared pieces of scrap metal from the chamber 17, the hydraulic drive 20 which operates the ram 19 is preferably operated with a rapid forward stroke to expedite the operation.

In the case of some forms of heavy scrap metal, the pieces which are dropped into the chamber 17 by the shearing action of the blades 14 and 15 are still larger than desired. Such large pieces of scrap within the chamber 17 can be subjected to a second shearing operation, generally at right angles to that of the blades 14 and 15, by the action of the blades 25 and 26. To accomplish this the scrap is pushed through the cutting plane of the blades 25 and 26 by a forwardly movement of the ram 19, to the extent necessary to give the pieces of the desired dimensions. The scrap is then sheared by the action of the blades 25 and 26 by the action of the hydraulic cylinder lowering the slide 24.

As will be fully understood from the foregoing, the machine in accordance with this invention, is both an efficient press for the baling of light scrap metal into coherent bales and an efficient shears for the cutting of heavy metal scrap into pieces which are of dimensions such that they can be used in smelting operations. Furthermore, it will be appreciated that each of the major components of this machine are equally useful and efficient in the baling of light scrap metal and in the breaking-up of heavy scrap metal which heretofore has required special shears to reduce it to useable form.

The hydraulic system of the main ram of a scrap baling press adapted to produce coherent bales of light scrap metal having the size, coherency and density which are now required for effective completion in the scrap metal industry, must exert tremendous power. Similarly, the hydraulic system which furnishes the force required by a shear capable of breaking up heavy scrap metal must be capable of exerting a heavy pressure. The machine in accordance with this invention, utilizes the same hydraulic system for both the compression of light scrap metal and for the cutting of heavy scrap metal. Thus, only one hydraulic system instead of two is required.

The main ram of a scrap baling press must withstand tremendous forces and stresses while maintaining precision in its operation. The carrier for the moveable blade of a heavy duty scrap metal shears must likewise withstand tremendous forces and stresses, while maintaining precision in its operation. The machine, in accordance with this invention, in its preferred embodiment, utilizes the same structure as a compression ram and as a knife carrier. Thus, it eliminates duplication of parts which are expensive to produce and which require engineering to precise tolerances and careful maintenance.

An efficient scrap baling press must have a secondary compression ram, a means for opening the pressing chamber for permitting the ejection of a compressed bale of scrap metal from the chamber and a means for the actual ejection of the compressed bale of scrap metal from the press chamber. The machine, in accordance with this invention, provides these features, rendering it highly efficient for the baling of light scrap metal. The same hydraulic mechanism is utilized in this machine for moving heavy scrap metal into position for a second shearing operation or for ejecting it from the pressing chamber, and for ejecting a bale of scrap metal from the pressing chamber, again avoiding a duplication of working mechanism. The closure of the pressing chamber of a scrap baling press must be capable of withstanding the force exerted by the secondary compression ram required for the lateral consolidation of a bale of light scrap metal. At the same time, it must be capable of rapid movement to permit the ejection of the bale of compressed scrap metal from the chamber. These are rigorous requirements which require a precisely engineered heavy duty mechanism. The machine, in accordance with this invention, by providing cooperative shearing blades on a slide-type closure for the pressing chamber, provides both an efficient mechanism for the closure of the pressing chamber for the baling of scrap metal, and in addition, provides a second shear which is adapted to make cuts at right angles to that of the main shear when the machine is used for breaking-up heavy metal scrap.

An efficient scrap baling press must have a positive feed of the scrap metal which is to be compressed, and a means by which any stoppage of the metal can be corrected. The machine in accordance with this invention provides mechanism which is adapted to receive either an intermittent or a continuous feed of light scrap metal and to positively deliver it to the zone in which it is compressed. In its preferred embodiment, it is adapted to pre-compress the light scrap metal to eliminate any tendency of the loose scrap metal to jam as it is being fed to the pressing zone of the machine. In the use of this machine for the shearing of heavy scrap metal, the positive feed for the light scrap metal is equally efficient for moving heavy scrap metal into cutting plane of the main shears of the press. Further, the mechanism which is adapted to pre-compress light scrap metal is equally efficient for rigidly holding heavy scrap metal to permit it to be efficiently cut by the main shears of the machine.

In either a scrap metal baling press or a shearing machine for scrap metal, the hydraulic drive mechanisms require a major fraction of the initial capital investment and of the cost for the maintenance of the machines. Further, it is well known that a hydraulic mechanism deteriorates rapidly when out of use. The machine, in accordance with this invention, permits the use of each of its hydraulic drives in either the baling of light scrap metal or the breaking up of heavy scrap metal, thereby reducing the initial capital investment required for the efficient operation of a scrap metal yard and at the same time permits a maximal usage of the drives which minimizes their deterioration by non-use.

Figure 5:
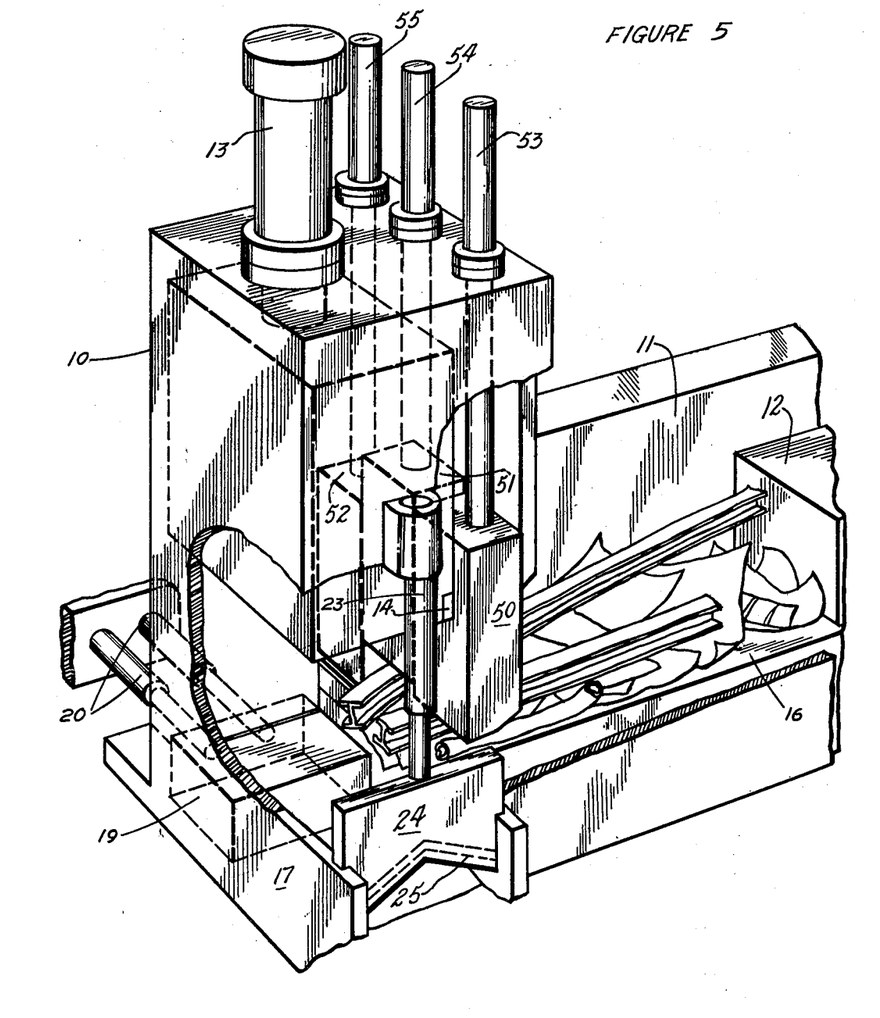
FIGURE 5 is a broken, diagrammatic, perspective view of an alternative embodiment of the machine in accordance with this invention which is provided with three rams positioned side by side across the end of the scrap-receiving chamber.

The ram 28 illustrated by FIGURES 1–4, inclusive, has a lower face 30 extending across the entire forwardly end of the scrap-receiving chamber 11. When this ram is lowered to hold scrap beneath its face 30 for shearing by the action of the blades 14 and 15, it bears on the thickest part of the scrap beneath its face and does not always firmly hold portions of the scrap in the thinner cross-sections of the load. FIGURE 5 illustrates a refinement of the machine illustrated by FIGURES 1–4, inclusive, which is provided with three rams, 50, 51 and 52, positioned side by side across the end of the scrap-receiving chamber 11, instead of the single ram 28 of the form of the machine illustrated by FIGURES 1–4, inclusive. These rams, 50, 51 and 52, are provided, respectively, with hydraulic drives, 53, 54 and 55. Each of the rams, 50, 51 and 52, operates separately and exerts its own pressure on the scrap beneath its working face and compresses it to the extent that its resistance permits. The result is that the entire cross-section of the load of scrap is more completely compressed and more securely held for cutting by the action of the blades 14 and 15 than is possible by the use of the single ram 28. Otherwise, this embodiment of the machine is identical with that illustrated by FIGURES 1–4, inclusive.

The foregoing details as to the construction and operation of preferred embodiments of the combination scrap metal baling and shearing machine in accordance with this invention have been given for the purpose of fully illustrating the invention. It will be fully understood that many modifications and changes can be made in these details without departing from the spirit of our invention or the scope of the following claims. It will be understood that the dimensions of this machine, the strength of its various members, and the forces which can be exerted by its various hydraulic drive mechanisms can be varied widely to adapt it for the most efficient and economical processing of the particular scrap metal which it is intended to handle. Many other such modifications in the details of this combination scrap metal baling and shearing machine will be obvious to those skilled in this art.

We claim:

1. A machine for preparing scrap metal which comprises at least one pair of blades adapted to cut scrap metal, a conveyor disposed in front of the cutting plane of a pair of said blades and adapted to move scrap metal into said cutting plane, a press chamber disposed behind said cutting plane and provided with a closable ejection aperture through which scrap metal can be ejected from the press chamber, means adapted to compress scrap metal within said press chamber, said means comprising at least one press ram disposed adjacent said cutting plane, and at least one further ram disposed in front of said cutting plane and adapted to pre-compress light scrap metal and to hold heavy scrap metal while the latter is cut by said blades.

2. A machine for preparing scrap metal which comprises at least one pair of blades adapted to cut scrap metal, one of the blades of said pair being movable and the other one fixed, a conveyor disposed in front of the cutting plane of a pair of said blades and adapted to move scrap metal into said cutting plane, a press chamber disposed behind said cutting plane and provided with a closable ejection aperture through which scrap metal can be ejected from the press chamber, means adapted to compress scrap metal within said press chamber, said means comprising at least one press ram disposed adjacent said cutting plane, said press ram being movable in a vertical direction and being the blade carrier for said movable blade, and at least one further ram disposed in front of said cutting plane and adapted to pre-compress light scrap metal and to hold heavy scrap metal while the latter is cut by said blades.

3. A machine for preparing scrap metal which comprises at least one pair of blades adapted to cut scrap metal, a conveyor disposed in front of the cutting plane of a pair of said blades and adapted to move scrap metal into said cutting plane, said conveyor including a scrap-receiving channel having bottom and side walls with an open top and a feed ram longitudinally and horizontally movable within said channel, a press chamber disposed behind said cutting plane and provided with a closable ejection aperture through which scrap metal can be ejected from the press chamber, means adapted to compress scrap metal within said press chamber, said means comprising at least one press ram disposed adjacent said cutting plane, and at least one further ram disposed in front of said cutting plane and adapted to pre-compress light scrap metal and to hold heavy scrap metal while the latter is cut by said blades.

4. A machine for preparing scrap metal which comprises at least one pair of blades adapted to cut scrap metal, one of the blades of said pair being movable and the other one fixed, a conveyor disposed in front of the cutting plane of a pair of said blades and adapted to move scrap metal into said cutting plane, said conveyor including a scrap-receiving channel having a bottom and side walls with an open top and a feed ram longitudinally and horizontally movable within said channel, a press chamber disposed behind said cutting plane and provided with a closable ejection aperture through which scrap metal can be ejected from the press chamber, means adapted to compress scrap metal within said press chamber, said means comprising at least one press ram disposed adjacent said cutting plane, said press ram being movable in a vertical direction and being the blade carrier for said movable blade, and at least one further ram disposed in front of said cutting plane and adapted to pre-compress light scrap metal and to hold heavy scrap metal while the latter is cut by said blades.

5. A machine as claimed in claim 3, in which said feed ram has a plate extending backwardly from the upper edge of the working face of said feed ram, said plate forming a scrap-receiving surface positioned below the top of said scrap-receiving channel.

6. A machine for preparing scrap metal which comprises at least one pair of blades adapted to cut scrap metal, a conveyor disposed in front of the cutting plane of a pair of said blades and adapted to move scrap metal into said cutting plane, said conveyor including a scrap-receiving channel which has an open top and a feed ram longitudinally and horizontally movable within said channel, a press chamber disposed behind said cutting plane and provided with a closable ejection aperture through which scrap metal can be ejected from the press chamber, means adapted to compress scrap metal within said press chamber, said means comprising at least one press ram disposed adjacent said cutting plane, at least one further ram disposed in front of said cutting plane and adapted to pre-compress light scrap metal and to hold heavy scrap metal while the latter is cut by said blades, and a wall disposed in front of said further ram, the distance of the lower edge of said wall from the bottom of said channel being not less than the height of said feeding ram.

7. A machine for preparing scrap metal which comprises at least one pair of blades adapted to cut scrap metal, one of the blades of said pair being movable and the other one fixed, a conveyor disposed in front of the cutting plane of a pair of said blades and adapted to move scrap metal into said cutting plane, said conveyor including a scrap-receiving channel having an open top and a feed ram longitudinally and horizontally movable within said channel, a press chamber disposed behind said cutting plane and provided with a closable ejection aperture through which scrap metal can be ejected from the press chamber, means adapted to compress scrap metal within said press chamber, said means comprising at least one press ram disposed adjacent said cutting plane, said press ram being movable in a vertical direction and being the blade carrier for said movable blade, at least one further ram disposed in front of said cutting plane and adapted to pre-compress light scrap-metal and to hold heavy scrap metal while the latter is cut by said blades, and a wall disposed in front of said further ram, the distance of the lower edge of said wall from the bottom of said channel being not less than the height of said feeding ram.

8. A machine for preparing scrap metal which comprises at least one pair of blades, one of the blades of the said pair being movable and the other one fixed, a conveyor disposed in front of the cutting plane of a pair of said blades and adapted to move scrap metal into said cutting plane, said conveyor including a scrap receiving channel having a bottom and side walls with an open top and a feed ram longitudinally and horizontally movable within said channel, a press chamber disposed behind said cutting plane and provided with a closable ejection aperture through which scrap metal can be ejected from the press chamber, means adapted to compress scrap metal within said press chamber, said means comprising at least one press ram disposed adjacent said cutting plane, said press ram being movable in a vertical direction and being the blade carrier for the said movable blade, a plurality of rams disposed side-by-side in front of said cutting plane, movable along a vertical path of travel and adapted to pre-compress light scrap metal and to hold heavy scrap metal while the latter is cut by said blades.

9. The combination with a charging box having a delivery end, of a baling chamber to which said charging box opens at said end, a charging ram having means for reciprocating it in the charging box toward and from the baling chamber, a shear ram having means for reciprocating it toward the baling chamber across the delivery end of the charging box, a baling ram having means for reciprocating it in the baling chamber transversely of the charging box and the shear ram, and relatively fixed and movable shear blades respectively fixed at the delivery end of the charging box and connected for movement with the shear ram for cooperation to sever material projecting from the open end of the charging box, said relatively fixed blade comprising a portion disposed obliquely with respect to the path of movement of the shear ram and the blade connected therewith, the charging box having a bottom portion with an oblique disposition corresponding to that of said fixed blade portion, the oblique position of the bottom portion of the charging box tending to bias work in the charging box toward a given position respecting the fixed blade.

10. The combination with a charging box having a delivery end, of a baling chamber to which said charging box opens at said end, a charging ram having means for reciprocating it in the charging box toward and from the baling chamber, a shear ram having means for reciprocating it toward the baling chamber across the delivery end of the charging box, a baling ram having means for reciprocating it in the baling chamber transversely of the charging box and the shear ram, and relatively fixed and movable shear blades respectively fixed at the delivery end of the charging box and connected for movement with the shear ram for cooperation to sever material projecting from the open end of the charging box, said relatively fixed blade comprising a portion disposed obliquely with respect to the path of movement of the shear ram and the blade connected therewith, the charging box having a bottom portion with an oblique disposition corresponding to that of said fixed blade portion, the oblique position of the bottom portion of the charging box tending to bias work in the charging box toward a given position respecting the fixed blade and a holddown ram head having means for actuating it across the open end of the charging box toward and from the fixed blade, the charging box having a V-shaped bottom and said fixed blade having a corresponding V-shaped contour and being disposed at the bottom of the charging box, the holddown ram head being operable to clamp work against the V-shaped bottom of the charging box.

11. A machine for preparing scrap metal which comprises at least one pair of blades adapted to cut scrap metal, a conveyor disposed in front of the cutting plane of a pair of said blades and adapted to move scrap metal into said cutting plane, a press chamber disposed behind said cutting plane and provided with a closable ejection aperture, means adapted to compress scrap metal within said press chamber, said means comprising at least one press ram disposed adjacent said cutting plane, and a plurality of rams disposed side-by-side in front of and laterally of said cutting plane, which are adapted by independent action to simultaneously precompress light scrap metal and to hold heavy scrap metal laterally disposed across the said cutting plane while they are cut by the said blade.

12. A machine for preparing scrap metal which comprises at least one pair of blades adapted to cut scrap metal, one of the blades of said pair being movable and the other one fixed, a conveyor disposed in front of the cutting plane of a pair of said blades and adapted to move scrap metal into said cutting plane, said conveyor including a scrap-receiving channel and a feed ram longitudinally and horizontally movable within said channel, a press chamber disposed behind said cutting plane and provided with a closable ejection aperture, means adapted to compress scrap metal within said press chamber, said means comprising at least one press ram disposed adjacent said cutting plane, said press ram being movable in a vertical direction and being the blade carrier for said movable blade, and a plurality of further rams disposed side-by-side in front of and laterally of said cutting plane across the exit end of the said scrap-receiving channel which are adapted to simultaneously precompress light scrap metal and to hold heavy scrap metal laterally disposed across the width of the exit end of the scrap-receiving channel.

13. The combination with a charging box having a delivery end, of a baling chamber to which said charging box opens at said end, a charging ram having means for receiprocating it in the charging box toward and from the baling chamber, a shear ram having means for reciprocating it toward the baling chamber across the delivery end of the charging box, a baling ram having means for reciprocating it in the baling chamber transversely of the charging box and the shear ram, and relatively fixed and movable shear blades respectively fixed at the delivery end of the charging box and connected for movement with the shear ram for cooperation to sever material projecting from the open end of the charging box, said relatively fixed blade comprising a portion disposed obliquely with respect to the path of movement of the shear ram and the blade connected therewith, the charging box having a bottom portion with an oblique disposition corresponding to that of said fixed blade portion, the oblique position of the bottom portion of the charging box tending to bias work in the charging box toward a given position respecting the fixed blade and a holddown ram head having means for actuating it across the charging box toward and from the fixed blade.

References Cited in the file of this patent

UNITED STATES PATENTS

| | | |
|---|---|---|
| 402,457 | Kennedy | Apr. 30, 1889 |
| 651,722 | Murphy | June 22, 1900 |
| 1,597,921 | Okins | Aug. 30, 1926 |
| 1,812,797 | Lindemann | June 30, 1931 |
| 2,203,884 | Stone | June 11, 1940 |
| 2,244,078 | Perlberg | June 3, 1941 |
| 2,362,701 | Koehring | Nov. 14, 1944 |
| 2,705,916 | Millgard | Apr. 12, 1955 |
| 2,748,694 | Thompson | June 5, 1956 |

FOREIGN PATENTS

| | | |
|---|---|---|
| 671,596 | Great Britain | May 7, 1952 |
| 794,000 | Great Britain | Apr. 23, 1958 |